E. P. CARPER & L. S. PATTERSON.
FOLDING EGG CRATE.
APPLICATION FILED APR. 17, 1916.
1,206,090.
Patented Nov. 28, 1916.
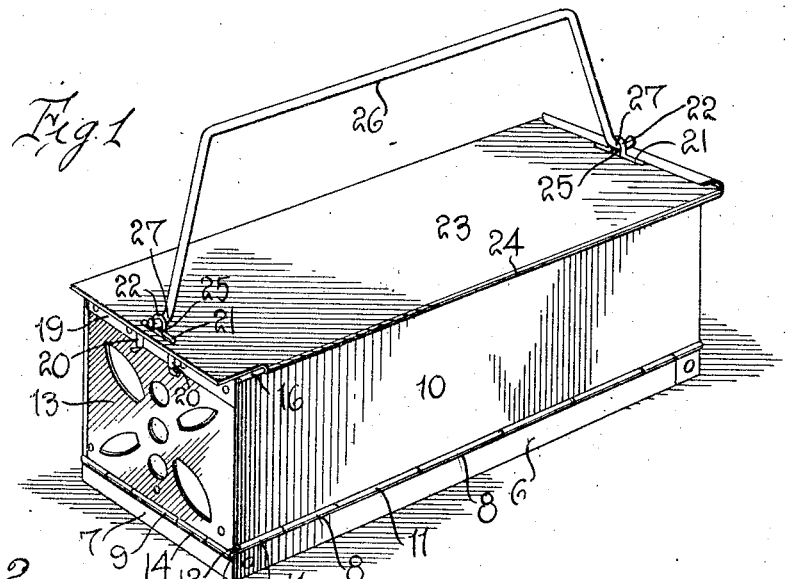
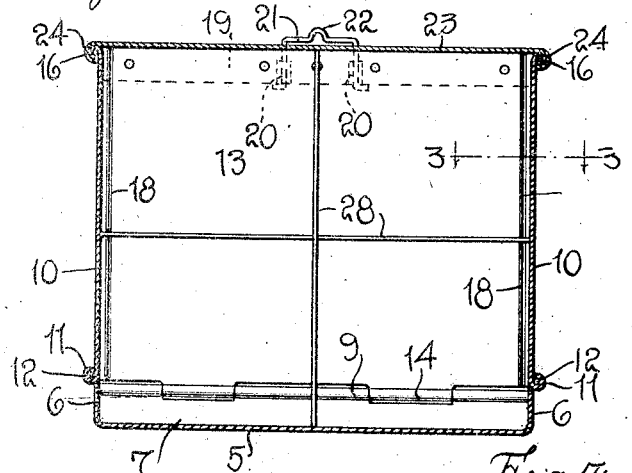
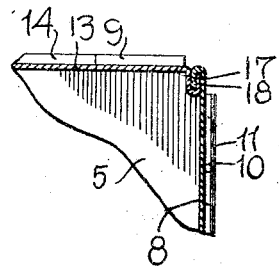
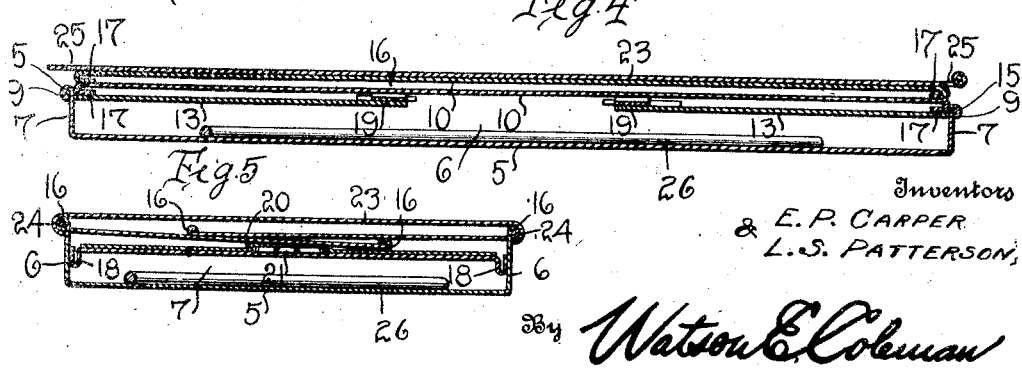
Inventors
E. P. CARPER
L. S. PATTERSON,
By Watson E. Coleman
Attorney

UNITED STATES PATENT OFFICE.

EMMETT PRICE CARPER AND LANE STRICKLER PATTERSON, OF FORDWICK, VIRGINIA.

FOLDING EGG-CRATE.

1,206,090.  Specification of Letters Patent.  Patented Nov. 28, 1916.

Application filed April 17, 1916. Serial No. 91,731.

*To all whom it may concern:*

Be it known that we, EMMETT P. CARPER and LANE S. PATTERSON, citizens of the United States, residing at Fordwick, in the county of Augusta and State of Virginia, have invented certain new and useful Improvements in Folding Egg-Crates, of which the following is a specification, reference being had to the accompanying drawings.

This invention relates to an improved folding egg crate and has for its primary object to provide a very simply constructed metallic case structure, the several walls of which may be compactly folded so that a large number of the crates may be arranged in a comparatively small space for convenience in shipment.

The invention has for another and more particular object to provide a crate of the above character embodying a bottom wall having upstanding flanges upon its marginal edges, side and end walls hingedly mounted on said flanges, and improved means for effecting a secure interlocking connection between the ends and side walls to maintain the same in their erect positions.

It is an additional object of the invention to provide a movable top or cover adapted to be slidably engaged upon the upper edges of the side walls, vertically movable bail eyes mounted upon the end walls of the crate, said top being provided with slots to receive said eyes, and a bail adapted to be detachably engaged at its ends in said eyes whereby the crate may be conveniently carried and the top is held against longitudinal shifting movement.

It is a further general object of our invention to produce a folding or collapsible crate which is simple and durable in its construction, highly convenient and serviceable in practical use, and may be manufactured at relatively small cost.

With the above and other objects in view, our invention consists in the novel features of construction, combination and arrangement of parts to be hereinafter more fully described, claimed and illustrated in the accompanying drawing, in which, Figure 1 is a perspective view of a crate constructed in accordance with the preferred embodiment of our invention; Fig. 2 is a transverse sectional view; Fig. 3 is an enlarged detail horizontal section taken on the line 3—3 of Fig. 2; Fig. 4 is a longitudinal sectional view of the crate folded; and Fig. 5 is a transverse sectional view of the folded crate.

Referring in detail to the drawing, 5 designates the bottom of the crate which is provided upon its longitudinal edges with the upstanding flanges 6 and upon its end edges with the relatively narrow, upstanding flanges 7. Each of these flanges is provided upon its upper edge with spaced knuckles indicated at 8 and 9 respectively. The side walls 10 of the crate are provided upon their lower edges with knuckles 11 adapted to be disposed between the knuckles 8 on the side flanges 6 of the crate bottom to receive the pintle rods 12. The end walls 13 of the crate are also provided with knuckles 14 on their lower edges adapted to be alined with the knuckles 9 on the end flanges 7 to receive the pintle rods 15.

Upon the upper edge of each of the side walls 10 an outturned bead 16 is formed, and the end edges of these side walls are inwardly turned or bent, as at 17, and spaced from the inner faces of said walls. Each end wall 13 of the crate also has its vertical edge portions bent inwardly and then bent outwardly to provide flanges 18 which are adapted for engagement between the inturned end edges 17 of the side walls and the faces of said walls. Thus, when the side and end walls of the crate are raised to erect positions upon the marginal flanges of the bottom 5, an interlocking connection is effected between the ends of said side and end walls so that they are retained in their erect positions and held against further outward movement.

A metal strap 19 is secured to the outer face of each of the end walls 13 at its upper edge and is formed with spaced vertical guides 20 to receive the parallel arms of a bail eye or loop 21 formed from a length of wire having an upwardly offset medial portion 22. 23 designates the top or cover of the crate which is provided along each of its longitudinal edges with an inwardly curved guide flange 24. These guide flanges are adapted for sliding engagement upon the outturned beads 16 on the upper edges of the side walls 10 of the crate. In each end of the crate top 23, a slot 25 is formed, and through said slots the offsets 22 in the bail eyes are adapted to be projected.

26 designates the bail which is formed from a single length of wire having obliquely disposed end portions provided upon their extremities with the outwardly projecting terminal lugs 27. These oblique ends of the bail wire are adapted to be forced inwardly and the lugs 27 engaged through the medial portions 22 of the eyes 21. Thus, the sliding top or cover of the plate will be held in its applied position against casual longitudinal movement. By means of the bail 26, the crate may be conveniently carried from place to place.

Within the crate, when the same is set up, suitable pasteboard egg fillers, indicated at 28, of the usual construction, are adapted to be arranged in order to separate the eggs from each other and obviate possible breakage thereof. When it is desired to fold or collapse the crate, the fillers 28 are first removed and folded, and arranged upon the bottom 5 of the crate. The ends 13 are then folded inwardly and downwardly and the sides of the crate then folded upon the ends 13. The flanged edges 25 of the top or cover 23 are then engaged upon the hinged knuckles 8 on the upper edges of the flanges 7, and said cover forced longitudinally over the superposed folded side walls of the crate. Thus, as seen in Fig. 4 of the drawing, the parts will be securely held in their assembled positions by the crate top. Before the sides of the crate are folded, the bail or handle may be placed upon the crate body, thereby obviating the possible loss of the latter.

From the foregoing description, taken in connection with the accompanying drawing, the construction, manner of operation and several advantages of the invention will be clearly and fully understood.

While the several walls or sections of the crate are preferably constructed of sheet metal, they may be obviously constructed of wood, pasteboard, or suitable composition material, as desired.

The crate can also be manufactured in various sizes, and for other purposes than the packing of eggs, as will be manifest.

It is further to be understood that while we have herein shown and described the preferred construction and arrangement of the several features of our improved crate, the same is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:—

In a folding crate, a bottom wall having upstanding marginal flanges, side and end walls hingedly mounted upon said marginal flanges, said side and end walls being provided with means upon their vertical edges for interlocking connection with each other to hold said walls in their erect positions, said side walls being each provided with a bead upon its free longitudinal edge, a removable top having inwardly curved flanges on its longitudinal edges for engagement with said beads, said side and end walls being foldable upon the bottom wall between the marginal flanges thereon, said top being provided with slots in its opposite ends, bail eyes vertically movable upon the ends of the crate and adapted for engagement through the respective slots, a bail having terminal studs adapted to be engaged through said eyes, whereby the cover is held against sliding movement, and the curved flanges on said top being adapted for sliding engagement with the hinge knuckles connecting the side walls to the bottom of the crate to retain the sides and ends of the crate in their superposed folded positions.

In testimony whereof we hereunto affix our signatures in the presence of two witnesses.

EMMETT PRICE CARPER.
LANE STRICKLER PATTERSON.

Witnesses:
CHAS. E. BLACK,
HARRY L. PARKER.

Copies of this patent may be obtained for five cents each, by addressing the "Commissioner of Patents, Washington, D C."